United States Patent [19]

Currie et al.

[11] 4,366,841

[45] Jan. 4, 1983

[54] COMPENSATING HOSE FITTING

[75] Inventors: William E. Currie, Cleveland Heights; Kenneth J. Korane, Bedford, both of Ohio

[73] Assignee: Parker-Hannifin Corporation, Cleveland, Ohio

[21] Appl. No.: 145,159

[22] Filed: Apr. 30, 1980

[51] Int. Cl.[3] .......................... F16L 9/00; F16L 11/08
[52] U.S. Cl. .................................. 138/109; 285/149; 285/256
[58] Field of Search .............. 138/109; 285/149, 243, 285/238, 256

[56] References Cited

U.S. PATENT DOCUMENTS

| | | | |
|---|---|---|---|
| 2,121,624 | 6/1938 | Cowles | 285/149 |
| 2,476,480 | 7/1949 | Burckle, et al. | 285/149 |
| 2,661,225 | 12/1953 | Lyon | 285/149 |
| 2,797,111 | 6/1957 | Beazley | 285/149 |
| 3,042,737 | 7/1962 | Brumbach et al. | 285/149 |
| 3,188,117 | 6/1965 | Press et al. | 285/149 |
| 3,300,163 | 1/1967 | Randolph | 285/243 |
| 3,367,683 | 2/1968 | Mattson | 285/243 |
| 3,990,728 | 11/1976 | Coughlin | 285/149 |
| 4,064,614 | 12/1977 | Horvath | 29/417 |
| 4,106,526 | 8/1978 | Szentmihaly | 138/109 |

FOREIGN PATENT DOCUMENTS 1022555 3/1966 United Kingdom ................ 285/149

*Primary Examiner*—Willis Little
*Attorney, Agent, or Firm*—Joseph B. Balazs

[57] ABSTRACT

This invention deals with a permanent hose fitting for use with reinforced hose including a flexible inner tube, a wire reinforcement which surrounds the inner tube and an outer cover, the hose being comprised primarily of rubber or rubber-like material. The fitting is of the steel socket and insert type wherein an annular recess is provided for receipt of the hose with cover thereon. Projections on the inner surface of the socket are of a configuration to pierce the cover upon crimping or swaging of the socket, to contact the reinforcement and to be deformed thereby into gripping engagement. Controlled bending of the shape-biased projections provides a device for accommodation of size and material differences and allows for compromise in fitting design for different sizes or styles of hose.

17 Claims, 4 Drawing Figures

COMPENSATING HOSE FITTING

BACKGROUND OF THE INVENTION

This invention relates to permanent hose fittings of the socket and insert type which are crimped or swaged onto hose having inner and outer layers of rubber-like material and one or more intermediate layers of wire reinforcement.

Both permanent and reusable hose fittings are well known in the art and typically are characterized further as being of the skive or no-skive variety referring to whether the outer cover of the hose is removed or not to achieve a desired engagement between the inner surface of the socket and the reinforcement or outer cover material. It is the usual practice with relatively high pressure rubber hose to assure that a direct engagement is made between the socket and wire reinforcement so that a secure grip is made upon the hose. This can be done either by the prior step of skiving the hose to expose the reinforcement or by the use of projections on the interior surface of the socket which penetrate the cover and directly engage the reinforcement.

One example of a permanent hose fitting is shown in U.S. Pat. No. 4,106,526. This typifies one form of prior art device in which the hose is prepared for coupling by skiving of the outer cover.

Another form of prior art is described in U.S. Pat. No. 3,287,033, this being a reusable type fitting in which the socket is threaded over the cover of the hose and the insert later added. This art is significant however in that the hose need not be prepared by skiving, in that threads on the socket are designed to cut through the cover and directly engage the wire reinforcement. In this arrangement the socket threads are relatively strong and are adapted to bite into and deflect the wire reinforcement in a preferred undulating pattern between the socket projections which provides a superior grip by utilizing the sharp edges of the socket thread.

One form of permanent fitting adapted to pierce the cover and engage the reinforcement of the hose is shown in U.S. Pat. No. 4,064,614, wherein pyramidal barbs are employed. These barbs are sharply pointed and have a sturdy base and would tend to move radially into the reinforcement upon crimping or swaging without deflecting either the reinforcement or the barbs.

Another form of permanently attachable fitting is disclosed in U.S. Pat. No. 2,797,111 wherein again, generally radially disposed projections are included in the socket to engage the reinforcement. The projections deform upon crimping or swaging in some embodiments apparently in an uncontrolled manner. Further the projections are in the form of threads which slice into the cover upon initial placement of the fitting.

SUMMARY OF THE INVENTION

The permanent fitting of the instant invention is of the non-skive type and may be utilized in a crimped or swaged assembly and is designed primarily for field attachment. The fitting includes a socket and insert, the socket having a plurality of inner, axially spaced annular projections which are adapted to pierce the cover of the hose, engage the reinforcement and be bent in a controlled manner into a preferred gripping orientation. The projections are shaped to control bending and have inner and outer flanks and a relatively blunt tip, but sharp intersecting edges therebetween. In one embodiment of the invention the outer flanks are disposed at an angle of about 20° with respect to a transverse plane, leaning toward the inner portion of the socket and adapted to be bent even further upon engagement with the reinforcement.

This controlled bending provides a device for accommodating for variations in hose sizes and for machining or crimping differences in the metal fitting. It allows for the use of a limited number of crimp diameters when working with different sized hose in both single and plural layer reinforcement styles. Further, a superior inner crimp configuration of more nearly circular shape is achieved with this hose fitting by means of heat treatment of the metal. This is provided by process annealing of the socket to achieve a desired softness so that even though a polygonal outer surface occurs in crimping, a more circular inner configuration is produced, providing superior integrity for the fitting.

DESCRIPTION OF THE PREFERRED EMBODIMENTS

Figure 1:
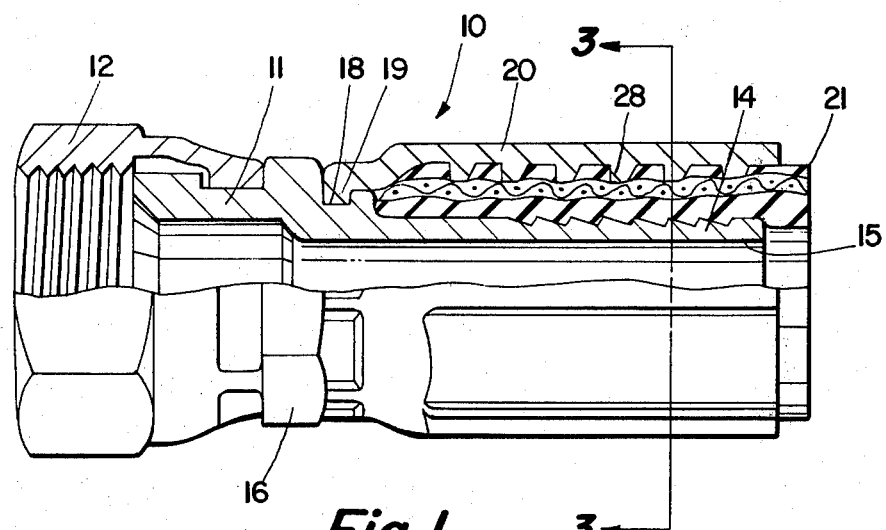
FIG. 1 is a longitudinal view of the crimped fitting of the invention, partly in cross section, showing an end portion of a hose secured therein.

Referring to FIG. 1, the hose fitting 10 of this invention is shown in crimped form as comprising a body member 11 having a connector nut 12 crimped thereto at one end for attachment to an external device utilizing fluid under pressure, an integral insert portion 14 at the other end, and a communicating bore 15. Wrench flats 16 in the form of a hex are disposed in the central port of the body member as is annular groove 18, receiving end ring 19 of socket member 20. The end of a hose 21 is shown crimped within the fitting 10 and as seen more clearly in FIG. 2 consists of an inner core 22, a section of wire reinforcement 24, and outer cover 25.

Insert 14 is a generally tubular member and in the preferred embodiment of the invention is depicted as integral with body member 11, and including a plurality of axially spaced annular barbs 26. The configuration of the external surface of the insert may as well be smooth or ribbed or other convenient shape as the primary function of same is to provide support for the interior of the hose 21 and a seal therewith, rather than to assist appreciably in resisting pull-out of the hose.

Socket 20 primarily provides the gripping function of the fitting 10 through the action of projections 28 on the internal surface thereof. Socket 20 is generally tubular having ring 19 at the inner end thereof for effecting a tight interconnection with body member 11, however the socket 20 could be machined as well from material forming body member 11 to provide an integral structure. Groove 18 in body member 11 preferably includes tapered side wall 29 so as to provide an interference fit when ring 19 is compressed therein although this could be accomplished as well by providing a tapered wall on the ring 19, or on both the ring 19 and groove 18.

The interference fit or solid interlock between socket 20 and body member 11 is necessary to eliminate play or relative movement between the socket 20 and insert 14 once the hose assembly is made and pressure applied. Such movement, if not prevented, could greatly shorten the life of the assembly by causing "working" of the core tube 22, causing it to work itself out of the compressed area, wear or crack in fatigue. Also any relative movement between socket 20 and body member 11 allows striking of the parts every time that pressure is applied, subjecting the parts to fatigue and shear in service.

Figure 2:
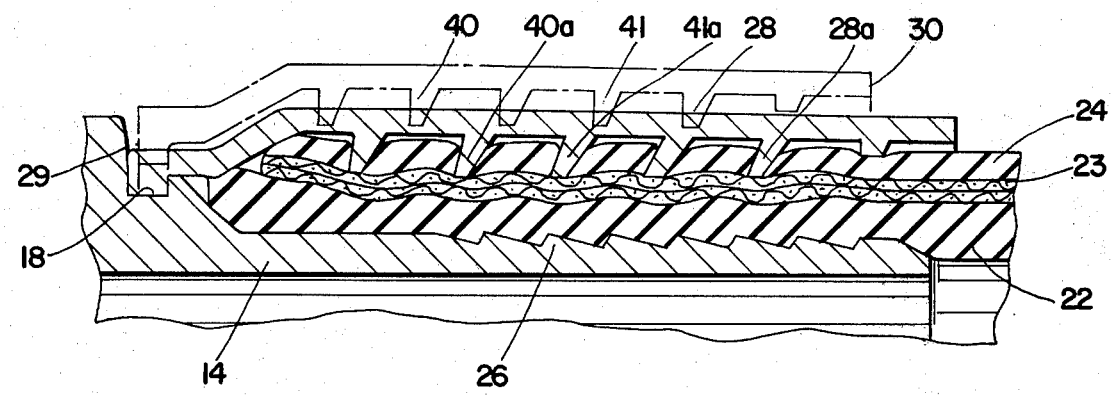
FIG. 2 is an enlarged sectional view of a portion of the crimped fitting with hose secured therein, showing the relationship of the socket prior to crimping, in dashed lines.

Socket 20 extends, prior to crimping as seen in dashed lines in FIG. 2, so that the free end 30 thereof generally overlies, but does not protrude beyond the end of insert 14, forming an annular recess between it and the insert 14 for receipt of hose 21. The inner surface of socket 20 includes a plurality of projections 28 which may be ring-like ribs, a spiral thread or threads or a very fast helical thread extending almost fully axially of the fitting. In the embodiment of the invention shown the projections 28 are threads having a very slow helix so that the projections 28 extend almost transversely of the axis of the fitting 10. A current preferred embodiment of the invention utilizes transverse ring-like ribs for the projections 28.

Figures 3, 4:
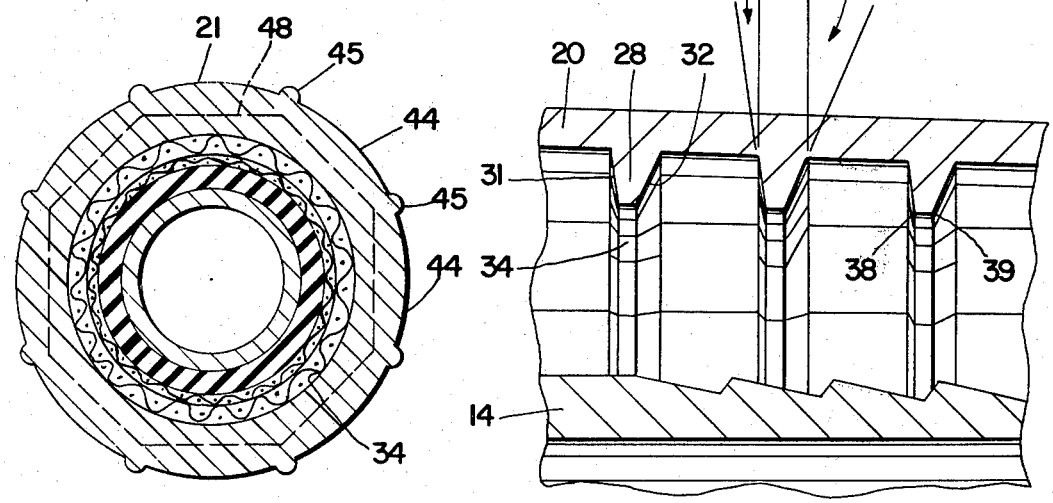
FIG. 3 is an end view of the crimped fitting taken along the lines of 3—3 of FIG. 1, showing the relationship between outer and inner surfaces.
FIG. 4 is an enlarged sectional view of a portion of the fitting prior to crimping.

As seen most clearly in FIG. 4 each projection 28 includes an inner side or flank 31, an outer flank 32 and a tip portion 34 therebetween. Inner flank 32 is disposed at a slight angle 35 outwardly with respect to a plane transverse to the central axis of the fitting. This angle 35 is of a minimum taper just sufficient to supply clearance for machining purposes and is on the order of 10° or less, in this embodiment being 3°. Outer flank 32 is disposed at a greater angle 36, in this instance inwardly and being on the order of 20°. Both flanks 31, 32 intersect generally flat but relatively blunt tip portion 34 in relatively sharp edges 38, 39 respectively.

The depth dimension of the projections 28 is dependent upon the thickness and type of cover 24 of the hose 21 to which the fitting is to be joined. In this embodiment the depth of projection is on the order of 1/10 inch and it has been determined that the depth should be approximately 0.015 inch greater than the maximum thickness of the cover 25 at any point.

The profile for the projections 28 of angled flanks 31, 32 provides a biased profile creating a tendency for the projection to bend in a pre-selected direction when it is brought into contact with the reinforcement 23. As seen in FIG. 2 as projections 28 are moved inwardly to engage the reinforcement 23, they will be bent in a leftward direction tending to tighten the grip on the hose 21 to trap same within the annular recess, the projections assuming the positions depicted at 28a with the sharp edges 38, 39 thereof embedded in the reinforcement 23, and with the latter in a slight undulating configuration, between the projections 28, enhancing the bite by the edges 38, 39.

It is noted in FIG. 2 that as the socket 20 is deformed the projections 28 move not only radially inwardly but also axially outwardly. This is seen as projection 40 moving to the position of projection 40a, while projection 41, toward the outer end of the socket 21, moves even further axially to the position depicted at 41a. Such axial movement occurs due to the fact that the socket 21 elongates so it becomes smaller in diameter and that a cumulative effect is produced at the outer projections. This movement, however, causes the projections 28 to strike the reinforcement at a slight angle rather than absolutely perpendicular, and augments the bending tendency of the projections 28, provided by the biased profile effected by angled flanks 31, 32.

The dimension of tip 34 of projection 28 should be limited to control the bending effect and a width on the order of less than 1/32 inch between edges 38, 39 is appropriate for hose on the order of ⅜ inch inside diameter. For hose such as SAE standard 100R1, such dimensions would be suitable while the projections would be spaced axially apart on the order of ¼ inch, on centers.

As previously indicated, projections 28 could as well be ring-like or transverse or in a faster helix and almost axial and with a similar biased profile provided by similar angled flanks, and produce much the same bending tendency and grip upon the reinforcement of the hose. Suitable modifications in dimensions might be necessary, however, the same general forces and relative movements between parts of the fitting 10 will occur to produce a similar gripping configuration.

One of the prime advantages of the fitting 10 of this invention is the compensation thus effected in accommodating for hose manufacturing and fitting machining tolerances. The projections 28 bite through the cover 24 of the hose 21 to engage the reinforcement 23 and then create the compensation in bending to a final position. The effect is that of "pressure-crimping," a technique of assembly in which crimping is continued only until a predetermined "pressure" or force of resistance is realized. This type of crimping produces excellent results but is unsuited to unskilled use in the field, and it is advantageous that the fitting 10 of the instant invention achieves some of the same effects, without requiring force-sensing equipment, and the like.

But another advantage of the fitting 10 is the simplification afforded in the crimping operation, because of the compensation effect. For example, the same size fitting 10 can be provided for single braid or double braid hose such as the SAE standard 100R1 and 100R2 types. All that is required is that the crimp diameter of the fitting socket 21 be adjusted to accommodate the additional layer of wire braid or larger diameter of braid and in fact for the various hose sizes only one adjustment is required between single and double wire braids which can be used for all sizes. This greatly simplifies the procedures required of field personnel and reduces the chances for error. Without the compensation effect, adoption of a single adjustment to accommodate the additional layer of wire braid in all sizes would require compromise, being too great in the small sizes and too little in the large sizes.

It is important with any hose fitting that the socket be very nearly circular at the points where it grips the hose, to minimize leakage. In the crimping operation however, the individual crimp fingers tend to create a polygon on the inside surface rather than a circle, because of the point contacts on the outside diameter, rather than a continuous contact around the periphery. It has been determined however, that this tendency can be altered by proper heat treatment of the socket. If the socket 31 is left in the half-hard condition best suited to machining, a polygonal shape is produced at the inside surface, but if the socket 21 is properly annealed then the gripping surface becomes more circular after crimping.

As seen in FIG. 3, the outside surface of the socket 21 is a series of eight arcs 44 formed by the configuration of the crimp fingers of a crimping machine, joined by intermediate relief protrusions 45 caused by the lack of continuity between the crimp fingers, and which consists of material which has not been crimped as far as the arcs 44. The inner surface of the socket 21, between projections 28, shown in dashed lines 48, is generally polygonal and this configuration would also be produced at the tips 34 of the projections if half-hard steel were used for the socket 21. However, by annealing properly, the tip 34 location is generally circular, providing a superior grip upon the reinforcement 23. In a preferred embodiment of this invention, socket 21 is made of C12 L14 steel and is softened to a maximum of Rockwell B70 by process annealing.

What is claimed is:

1. A hose fitting for permanent attachment to the end of a wire reinforced hose which is used for conveyance of fluid under pressure comprising, a body member having a bore therethrough providing a fluid interconnection between connecting means at one end adapted for connection to an external device, and an insert at the other end adapted for insertion within the reinforced hose, said insert comprising a substantially tubular member extending away from said body member, terminating in a remote end and having an outer surface adapted for sealing engagement with the interior of the reinforced hose, a socket member of substantially tubular shape surrounding said insert forming an annular recess therebetween adapted for receipt of the reinforced hose, said socket being supported at one end on said body member and having a free end near said remote end of said insert, said socket having projections on the inner surface in the annular space, directed radially inwardly toward said insert and axially toward said one end of said socket said projections having opposed flanks intersecting with a relatively blunt tip, said flanks being disposed at different angles with respect to a transverse plane so as to form a non-symmetric profile and a tendency for said projections to bend in a predetermined direction toward said one end of said socket, said projections being of equal or greater depth than the thickness of the cover of said inserted hose member and of slender proportions so that, upon application of radially inward clamping force upon said socket member to reduce the diameter of the exterior of said socket member to a predetermined dimension, the tips of said projections will engage the reinforcement layer of said inserted hose member and said projections will be deformed in such predetermined direction, thereby to equalize the gripping force of said projections with said reinforcement layer about the periphery of said inserted hose member regardless of manufacturing variations of the hose member and the fitting.

2. The fitting set forth in claim 1 wherein said projections are circumferentially continuous and are biased toward said one end of said fitting.

3. The fitting set forth in claim 2 wherein said projections are annular.

4. The fitting set forth in claim 2 wherein said projections are spiral.

5. The fitting set forth in claim 2 wherein said projections have inner and outer flanks intersecting a relatively blunt tip, said inner flanks being angled slightly outwardly and said outer flanks being angled inwardly at a greater angle.

6. The fitting set forth in claim 5 wherein said inner and outer flanks of said projections are angled at about 3° and 20° respectively with respect to a plane normal to the axis of said fitting.

7. The fitting set forth in claim 5 wherein said projection tip intersects said inner and outer flanks at relatively sharp edges, said edges being spaced on the order of 1/32 inch or less.

8. In combination a hose fitting and a flexible hose which has inner and outer layers and a wire reinforcement therebetween, said fitting including a metal socket and an insert, said socket being compressed onto said hose and having projections on the inner surface which pierce said outer hose layer and are bent by engagement with said wire reinforcement in a predetermined direction toward one end of said fitting to tend to draw said hose further into said fitting as said socket is reduced to a predetermined dimension, said projections being of slender proportions, and having a depth substantially the same as the maximum thickness of said outer hose layer so as to achieve metal-to-metal contact with said reinforcement and relatively sharp edges at the tip thereof so as to grip said reinforcement, said projections having an axially outer surface disposed at an angle with respect to a plane passing normal through the axis of said fitting which angle is greater than in an undeformed fitting, said angle being on the order of 20 degrees in an undeformed fitting, the tips of said projections lying in a substantially circular configuration of equalized pressure distribution about the periphery of said wire reinforcement.

9. The combination set forth in claim 8 wherein the width of said projection at the tip thereof is on the order of 1/32 inch.

10. The combination set forth in claim 8 wherein said socket is softened by annealing to a maximum hardness of Rockwell B70.

11. The combination set forth in claim 10 wherein said socket is formed of C12 L14 steel and is softened by process annealing.

12. The combination set forth in claim 9 wherein said hose comprises at least two layers of wire reinforcement therein, said projections being sized to contact only said outer layer of reinforcement.

13. The combination set forth in claim 9 wherein the thickness of said socket is greater than the width of the tip of said projection but less than the width of the base.

14. The combination set forth in claim 9 wherein said projections are annular and axially spaced.

15. The combination set forth in claim 9 wherein the outer surface of said insert has barbs thereon.

16. The combination set forth in claim 9 wherein said hose is SAE 100R1 rubber hose having steel wire braid reinforcement.

17. The combination set forth in claim 10 wherein the outer surface of said socket is crimped in a generally polygonal configuration and the inner periphery of said socket is substantially circular.

* * * * *